(12) United States Patent
Brommer

(10) Patent No.: US 7,233,620 B2
(45) Date of Patent: Jun. 19, 2007

(54) BANDWIDTH-EFFICIENT WIRELESS NETWORK MODEM

(75) Inventor: Karl D Brommer, Hampton Falls, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 980 days.

(21) Appl. No.: 10/125,241

(22) Filed: Apr. 18, 2002

(65) Prior Publication Data

US 2003/0026356 A1 Feb. 6, 2003

Related U.S. Application Data

(60) Provisional application No. 60/284,629, filed on Apr. 18, 2001.

(51) Int. Cl.
*H04B 1/66* (2006.01)
(52) U.S. Cl. .............. 375/240; 375/219; 375/220; 375/222; 375/324
(58) Field of Classification Search ........... 375/240, 375/222, 220, 219, 324
See application file for complete search history.

(56) References Cited

U.S. PATENT DOCUMENTS

| | | | |
|---|---|---|---|
| 4,580,276 A | | 4/1986 | Andruzzi, Jr. et al. |
| 4,750,171 A | | 6/1988 | Kedar et al. |
| 4,794,635 A | | 12/1988 | Hess |
| 5,546,379 A | | 8/1996 | Thaweethai et al. |
| 5,596,439 A | | 1/1997 | Dankberg et al. |
| 5,752,164 A | | 5/1998 | Jones |
| 5,894,500 A | | 4/1999 | Bruckert et al. |
| 6,052,364 A | * | 4/2000 | Chalmers et al. ........... 370/312 |
| 6,061,406 A | * | 5/2000 | Carson et al. .............. 375/260 |
| 6,151,335 A | * | 11/2000 | Ko et al. .................... 370/487 |
| 6,185,197 B1 | | 2/2001 | Cheung Yeung et al. |
| 6,535,716 B1 | * | 3/2003 | Reichman et al. ......... 455/12.1 |

(Continued)

FOREIGN PATENT DOCUMENTS

| | | |
|---|---|---|
| JP | 11340952 | 12/1999 |
| JP | 2000115028 | 4/2000 |
| WO | 9428642 | 12/1994 |
| WO | 9507578 | 3/1995 |
| WO | 0072455 A1 | 11/2000 |

OTHER PUBLICATIONS

Newton (Newton's Telecom Dictionary, pp. 230, 1998).*

(Continued)

*Primary Examiner*—Dac Ha
*Assistant Examiner*—Ted M. Wang
(74) *Attorney, Agent, or Firm*—Maine & Asmus

(57) ABSTRACT

Wireless communication network dynamically assigning communicators to allocated channels by considering the interference and noise environment to maximize the number of communicators and effective bandwidth of the channel. The present invention provides a digital wireless modem capable of measuring interference and noise in a channel, signaling the information on a control channel, accepting dynamic channel assignments from a controlling element and demodulating signals in the presence of interference and noise. The modem uses a demodulator capable of recovering information from data signals in the presence of noise and interference stronger than the primary signal, and there is a controlling element for transmitting noise and interference measurements to a central network controller and a controlling element for determining channel assignments with the central network controller and setting the modem to the correct transmission and reception channel.

15 Claims, 7 Drawing Sheets

U.S. PATENT DOCUMENTS 6,782,277 B1 *   8/2004   Chen et al. .................. 342/359
6,870,808 B1 *   3/2005   Liu et al. .................... 370/203
2001/0053132 A1  12/2001  Sala et al.

OTHER PUBLICATIONS

CDMA/HDR: a bandwidth efficient high speed wireless data service for nomadic users Bender, P.; Black P.; Grob M.; Padovani, R.; Sindhushyana, N.; Viterbi, S.; Communications Magazine, IEEE vol. 38, Issue 7, Jul. 2000 pp. 70-77.*

PCT International Search Report dated Aug. 2, 2002 of International Application No. PCT/US02/12401 filed Apr. 18, 2002.

Ostergaard, Rolf V., "Cable-Modems.Org: The Cable Modem Reference Guide", May 2003, pp. 1-2, Rolf V. Ostergaard.

Translation of Japanese Office Action, May 23, 2006, pp. 1-4, Mail No. 200047.

* cited by examiner

BANDWIDTH-EFFICIENT WIRELESS NETWORK MODEM

CROSS REFERENCE TO RELATED APPLICATIONS

This application claims the benefit of U.S. Provisional Patent Application Ser. No. 60/284,629 filed on Apr. 18, 2001, herein incorporated in its entirety by reference.

STATEMENT OF GOVERNMENT INTEREST

Not Applicable.

BACKGROUND OF THE INVENTION

1. Technical Field of the Invention

The present invention generally relates to a digital signal demodulator and modulator and particularly to such a demodulator and modulator for networks where efficient use of allocated frequency bandwidth is desirable.

2. Background Art

The telecommunications industry has been expanding at an unprecedented growth rate. In particular, the wireless sector, including 3G, wireless local area networks, smart appliances, telephone traffic with digital voice encoding, video conferencing, wide area computer network connectivity, Internet service and Bluetooth devices, has grown far beyond expectations and at a much higher rate than the fixed telecommunications counterpart. The content of the wireless sector is also changing, with more and more data being transmitted, including Internet connectivity and live feeds. And, this wireless phenomenon is not limited to any geographical boundaries, as the growth is occurring around the globe. While the content is expanding with new applications arising for use in wireless frequency bands, the amount of bandwidth allocated for these applications is a generally fixed or at least limited resource.

Wireless networks are employed to facilitate the communication between computers and other electronic devices. Network management is thus a control scheme that tries to efficiently use a given bandwidth and in order to transmit the most information. In all cases, it is desirable to maximize the network traffic capacity in a given bandwidth in the presence of interference and noise.

A variety of schemes exist for efficiently partitioning the network elements into communication channels. Frequency domain multiple access (FDMA) schemes assign each terminal to a separate, non-overlapping frequency band. Time domain multiple access (TDMA) schemes assign each terminal to a separate non-overlapping time slot. Code division multiple access (CDMA) schemes assign each terminal to a separate modulating waveform so that the cross correlation between each terminal is negligible.

Digitally modulated signals like binary phase shift keyed (BPSK) and quadrature phase shift keyed (QPSK) signals are transmitted between the various network nodes. Examples include satellite communications networks where terminals transmit through satellite transponders, terrestrial elements where terminals transmit through repeating towers and indoor local area networks where terminals transmit through central repeating elements. In each instance digital data is exchanged through wireless transmission to central repeating elements.

All of these schemes are inefficient in the sense that given sufficient signal to noise strength or coding redundancy, more communicators could use the allocated bandwidth if provided with means for detecting the excess signal margin and means for demodulating signals in the presence of interference.

In the past, prior art communication systems generally utilized Frequency Division Multiple Access (FDMA) and Time Division Multiple Access (TDMA) methods to achieve channel access. FDMA refers to a communication channel wherein a signal's transmission power is concentrated into a single radio frequency band. Interference from adjacent channels is limited by the use of band pass filters. However for each channel being assigned a different frequency, system capacity is limited by the available frequencies and by limitations imposed by channel reuse.

In TDMA systems, a channel consists of a time slot or frame in a periodic train of time intervals over the same frequency, with a given signal's energy confined to one of these time slots. Adjacent channel interference is limited by the use of a time gate or other synchronization element that only passes signal energy received at the proper time. The system capacity is limited by the available time slots as well as by limitations imposed by channel reuse, as each channel is assigned a different time slot.

One of the goals of FDMA and TDMA systems is to try and prevent two potentially interfering signals from occupying the same frequency at the same time. In contrast, Code Division Multiple Access (CDMA) techniques allow signals to overlap in both time and frequency. CDMA signals share the same frequency spectrum and in the frequency or time domain, the CDMA signals appear to overlap one another. The use of CDMA greatly increases the capacity of the analog TDMA/FDMA systems and with a high bit rate decoder permits superior voice transmissions. CDMA also provides for variable data rates allowing many different grades of voice quality to be offered. Finally, the scrambled signal format of CDMA eliminates cross talk and makes it more difficult to eavesdrop or monitor calls therefore providing greater security.

In a CDMA system, each signal is transmitted using spread spectrum techniques. The transmitted informational data stream is impressed upon a much higher rate data stream termed a signature sequence. The bit stream of the signature sequence data is typically binary, and can be generated using a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signature signal with the lower bit rate data stream is called spreading the informational data stream signal. Each informational data stream or channel is allocated a unique signature sequence.

In operation, a plurality of spread information signals, such as binary phase shift keying (BPSK) or quadrature phase shift keying (QPSK) modulation, modulate a radio frequency (RF) carrier and are jointly received as a composite signal at the receiver. Each of the spread signals overlaps all of the other spread signals, as well as noise-related signals, in both frequency and time. The receiver correlates the composite signal with one of the unique signature sequences, and the corresponding information signal is isolated and despread.

Wireless networks are employed for a variety of communications, for example, connectivity between computers. Digitally modulated signals like binary phase shift keyed (BPSK) and quadrature phase shift keyed (QPSK) signals are transmitted between the various network nodes.

Examples include satellite communications networks where terminals transmit through satellite transponders, terrestrial elements where terminals transmit through repeating towers and indoor local area networks where terminals transmit through central repeating elements or hubs. In each instance digital data is exchanged through wireless transmission with some control over the communications.

The computer elements connected to these networks provide a variety of user services. Examples include telephone traffic with digital voice encoding, video conferencing, wide area computer network connectivity, and Internet service. In each case it is desirable to maximize the network traffic capacity in a given bandwidth in the presence of interference and noise.

The prior art schemes are inefficient in the sense that given sufficient signal to noise strength or coding redundancy, more communicators could use the allocated bandwidth if provided with means for detecting the excess signal margin and means for demodulating signals in the presence of interference.

There have been attempts at multi user receivers, and there are numerous articles related to the topic based on theoretical postulations, however these also have general deficiencies. One multi user approach demodulates all user signals in an initial stage and forms an interference replica for each user. In subsequent processing all interference replicas except for the desired signal are subtracted from an input signal received to remove the interference. In the following stage, demodulation is made again about the desired signal by using a signal obtained by the initial stage. As a result, the user signal quality is improved as compared with the initial stage, and it is readily apparent that interference cancellation characteristic is gradually improved by repeating this process several times with a multistage structure. Another receiver employs a serial structure for canceling interference. When performing interference cancellation at each stage, the interference replica is transferred between stages and the interference replica is stored in memory. The deficiency here is that signals must have substantially different amplitudes for successive cancellation to be feasible. Since interfering amplitudes are arbitrary, this circumstance rarely occurs. Moreover, successive interference cancellation tends to distort the residual signal, and at some point, the cancellation process renders the signal of interest unrecoverable.

U.S. Pat. No. 5,596,439 ('439) discloses one form of a transmitted digital modulation that allows it to be subtracted out so that a full duplex link fits on a single channel. This method works for a pair of transmissions on a duplex link, and it is complementary to the method of the present invention described herein. The joint detection method described therein works with the reference signal method, as the reference signal is a known waveform that may be subtracted out. However, the method of the present invention is more general. The method in the referenced '439 patent applies to a pair of signals on a duplex link when one of the signals is transmitted by the terminal applying the method. The method of the present invention applies to any number of interfering digital signals on the same channel provided that sufficient signal to noise margin exists to jointly demodulate all of the signals.

In another technique, multipath signals other than the main path signal are considered to be interference and the multipath signals are not utilized to be combined into the desired signal. Multipath is a separate issue that is handled by the design of the present invention as well as many other methods.

The need for adding more users to the existing infrastructure and within a limited bandwidth are generally recognized. Thus far, the efforts of multi-user systems have been hampered when going from the theoretical models to the working models. The present invention describes a working model. What is needed is a more efficient communications system that provides a communication network that dynamically assigns communicators to allocated channel by considering the interference and noise environment with an objective of maximizing the number of communicators and effective bandwidth of the channel.

SUMMARY OF THE INVENTION

The invention is devised in the light of the problems of the prior art described herein. Accordingly it is a general object of the present invention to provide a novel and useful apparatus and technique that can solve the problems described herein.

Accordingly it is an object to provide a wireless communication network that dynamically assigns communicators to allocated channel by considering the interference and noise environment with an objective of maximizing the number of communicators and effective bandwidth of the channel. Another object is to provide modems that can demodulate digital signals in the presence of interference and noise. Furthermore, to provide modems that can demodulate multiple digital signals on the same channel.

In addition, an object is to provide modems that can demodulate digital signals transmitted at power levels much lower than the levels of the interfering signals. A still further object is to provide modems that can measure the interference and noise environment of the communication channel. A further object is to provide a network controlling element that dynamically assigns communication channels with consideration to fully consuming excess power margins in the channel with the objective of maximizing the number of communicators and effective bandwidth of the channel. And, to apply the technology to applications wherein one network element functions as the network controlling element.

Another object is to apply the technology to mesh wireless network operating in the absence of a central network controlling element. Additionally, to provide means for adding bandwidth-efficient modems to existing digital networks without replacing conventional modems operating in the network. The present apparatus provides a digital wireless modem capable of measuring interference and noise in a channel, signaling the information on a control channel, accepting dynamic channel assignments from a scheduling element and demodulating QPSK and BPSK signals in the presence of interference and noise, including a demodulator capable of recovering information from BPSK and QPSK data signals in the presence of noise and interference stronger than the primary signal, a detector for measuring noise and interference levels in the channel, a controlling element for transmitting noise and interference measurements to a central network controller and a controlling element for determining channel assignments with the network scheduler and setting the modem to the correct transmission and reception channel.

In one embodiment of the present invention, joint detection and scheduling is used to capture excess margin in a communication system. Modems with this capability exploit the excess margin available in communications channels. Margins is already available and the modem takes advantage of the processing capabilities described herein to more efficiently allocate the bandwidth for such applications as satellite, cable, wireless LAN, cellular telephony, and mobile radio. The principles of the modulation/demodulation device extend to many applications that benefit from packing more users and signals within a given bandwidth. For example, with the mobile radio example, the central transmitter element is similar to a satellite transmitter and employs a star architecture, and more signals/users can be provided in a given bandwidth. Cell phone systems benefit for example, where truck companies, police, taxis can make up their own mobile radio systems and rent satellite space wherein the present system can pack more users in the given space.

An object of the invention is a bandwidth efficient modem in a multi-user environment for determining whether additional users can be added to a system, comprising, a front end unit for processing input received signals into a baseband waveform. There is a baseband waveform processor performing parameter estimation and demodulation of the baseband waveform, with a digital signal processor for reconstructing an estimate of each interfering signal and calculating a noise power, wherein the noise power is used to determine whether there is a sufficient noise margin to add additional users, and wherein the reconstructing requires data from the parameter estimation and demodulation. A waveform generator is used for processing channel communications, wherein the channel communications consist of message and signal information, communicated to the system.

Another object is the bandwidth efficient modem, further comprising a single antenna with a diplexer coupled to the front end unit for transmission and reception. Alternatively, the modem can use a reception antenna and a transmitter antenna coupled to the front end. In variations employing hardwire no antenna is needed. An additional object is the bandwidth efficient modem, wherein the parameter estimation is performed by a parameter estimator and estimates amplitudes, carrier phases, carrier frequencies, symbol rates and symbol phases for each of the interfering signals. In addition, the demodulation can be performed by a joint detector in the baseband waveform processor, wherein the joint detector demodulates the interfering signals and produces a set of bit values and bit error rates for each signal. A further object is where the demodulation is a processing scheme selected from the group comprising an optimal maximum likelihood multi user detection (MUD), maximum likelihood MUD, maximum likelihood sequence estimation, successive interference cancellation, TurboMUD, iterative MUD, and linear algebra based MUD. And even further, wherein the demodulation processes the baseband waveform in the presence of noise and interference stronger than information signals.

An object of the invention is a bandwidth efficient system for a communications network, comprising a plurality of bandwidth efficient modems each interconnected to the network by a traffic channel and a signaling channel, wherein the modems process interference and noise levels in the traffic channel and recover information signals of the traffic channel, and wherein the modems communicate with the network through the signaling channel. The central network controller is coupled to the bandwidth efficient modems, wherein the controller monitors signal quality of each traffic channel and dynamically allocates channel assignments to the bandwidth efficient modems according to the interference and noise levels.

Yet another object is the bandwidth efficient system, wherein the network is heterogeneous and further comprising one or more legacy modems coexisting on the network with the bandwidth efficient modems. In addition, wherein a means for connecting the modem on the network is selected from the group comprising: bi-directional channels, indirect through a hub element, and directly via a hardwire interconnection. Also, wherein the channel communication interchange is based upon conditions selected from the group comprising: a request from the network controller; a time interval, and a measured signal level. And, the bandwidth efficient system, wherein the channel communication comprises channel status parameters, channel service request messages, and network messages. The bandwidth efficient system can be coupled to the modems as a star network or a mesh network which provides redundancy when each of the bandwidth efficient modems is functional as a network controller.

An object of the invention is a method of efficiently allocating channels on a communications network having a network controller coupled to a plurality of bandwidth efficient terminals, comprising the steps of processing a received signal into a baseband waveform in each of the terminals, measuring interference and noise levels in a channel of of baseband waveform, transmitting the interference and noise levels from the terminals to the network controller, processing channel assignments in the network controller based on the interference and noise levels, and sending transmission and reception channel assignments from the network controller to the terminals.

And a further object is the method of efficiently allocating channels, further comprising the step of assigning bandwidth efficient modems to channels already occupied by other modems when there is sufficient signal-to-noise margin, or setting a signal level sufficiently low to fall within carrier-to-interference level requirements where a channel is occupied by a legacy terminal, or setting a signal level sufficiently high where a channel is occupied by a bandwidth efficient terminal. A final object is the method of efficiently allocating channels, wherein the step of measuring comprises the steps of parameter estimation and demodulation.

Still other objects and advantages of the present invention will become readily apparent to those skilled in this art from the following detailed description, wherein we have shown and described only a certain embodiment of the invention, simply by way of illustration contemplated by us on carrying out our invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

The methods and embodiments of the network modem disclosed herein enable implementations of advanced communications providing with high quality real-time processing with interferers. The preferred embodiment is just an illustration of the apparatus and processes that are applicable to many variations and applications all within the scope of the invention.

Figure 1:
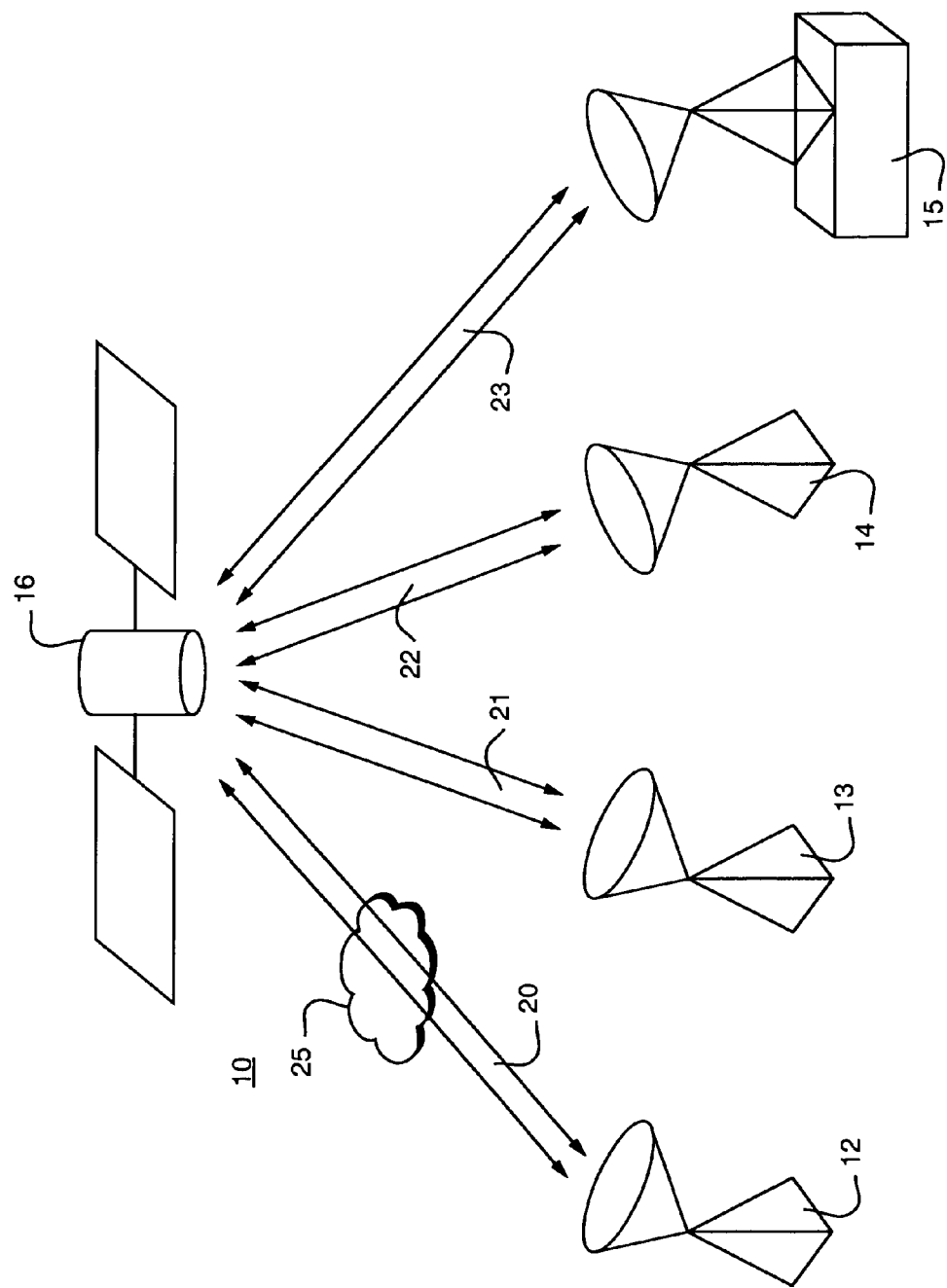
FIG. 1 illustrates an overview of a wireless network where terminals communicate through a central transponding element identifying terminals, the transponder, the controlling element and the signaling channels.

FIG. 1 shows an example network 10 of terminals 12-15 communicating through a satellite transponder 16. The satellite transponder 16 is one embodiment of a signal transponding element, and other elements performing a similar function include repeater towers for terrestrial point-to-point radio and microwave communications and fixed transponders for local area networks. While the physical means differ, the network architecture necessary to employ the present apparatus is the same. It is also within the scope of the invention that the terminals communicate directly without transmitting through a transponding element.

In each case, user terminals 12-15 communicate pair-wise with the other terminals using bi-directional traffic channels 20-23 radiating through the transponding element as shown in FIG. 1. These channels 20-23 may be allocated according to separate frequencies in a frequency domain multiple access scheme (FDMA), time slots in a time domain multiple access scheme (TDMA), codes in a code division multiple access scheme (CDMA) or any other means of partitioning signals, including the hybrid forms.

Both the bandwidth and propagation conditions differ for the different terminals 12-15 in the network 10. In the example of FIG. 1, terminal 12 suffers from poor propagation due to the presence of clouds 25, while the other terminals can have excess signal margin due to clear line of sight propagation conditions. As known to those skilled in the art, there are many factors that can affect signal communications and clouds 25 are just a single factor.

A network control terminal 15 allocates traffic communication channels to the other terminals 12-14. The network control terminal 15 communicates channel assignments using a signaling channel, which in this embodiment is within the bidirectional traffic channel 23. The signaling channel of the bidirectional traffic channel 23 is used for signaling channel assignments, status messages and other activity to maintain inter-terminal communications on the traffic channels. This signaling channel 23 can be a dedicated link between the controlling element and each user terminal or it can be a shared channel. In cases where it is a dedicated link, its bandwidth is generally much lower than the traffic channel bandwidth as signaling is relatively infrequent and low throughput compared to data traffic. It is also possible to implement the signaling channel as a shared channel using an ALOHA protocol or carrier sense multiple access protocol or some other shared channel protocol.

The network 10 is heterogeneous in the sense that some terminals in the network use conventional, legacy modems while others use the bandwidth-efficient modems described herein. Channel communication may be direct between terminals via the bi-directional channels 20-23 as shown in FIG. 1. It can also be indirect through a hub element, or directly via a hardwire interconnection. The network channel communication capability is important, while the means for implementing arises in many forms.

In one embodiment each of the bandwidth efficient modems are capable of operating as the network control terminal. The internal hardware elements and microprocessor of any of the terminals can perform as the primary network controller to coordinate communications. The selection of the network controller terminal can be based on whichever terminal has the best signal power and communication ability with the other transponder or other terminals. If the present network terminal is blocked or malfunctioning, another terminal can take control.

The network control terminal 15 monitors the status of each terminal 12-14 in the network to ensure that each user is able to operate as close as possible to its desired data throughput rate. The network control terminal 15 monitors the signal quality in each channel 12-14 as reported in terms of bit error rate communicated by all terminals in the network 10. One or more of the terminals 12-14 can be a bandwidth efficient modem, which also reports signal to noise (S/N) and signal to interference (S/I) levels. The network control terminal 15 assigns traffic channels in a manner that exploits the capability of bandwidth efficient modems to demodulate signals in the presence of strong interference.

Specifically, when sufficient signal-to-noise margin exists, the network control terminal 15 will assign terminals with bandwidth efficient modems to channels already occupied by other terminals. In cases where the channel is occupied by legacy terminals, the signal level will be set sufficiently low to fall within carrier-to-interference level requirements for the legacy terminal. In cases where the channel is occupied by a bandwidth-efficient terminal, the signal level will be set higher, but still low enough for both terminals to demodulate their signals even with the other modem occupying the same channel.

Figure 2:
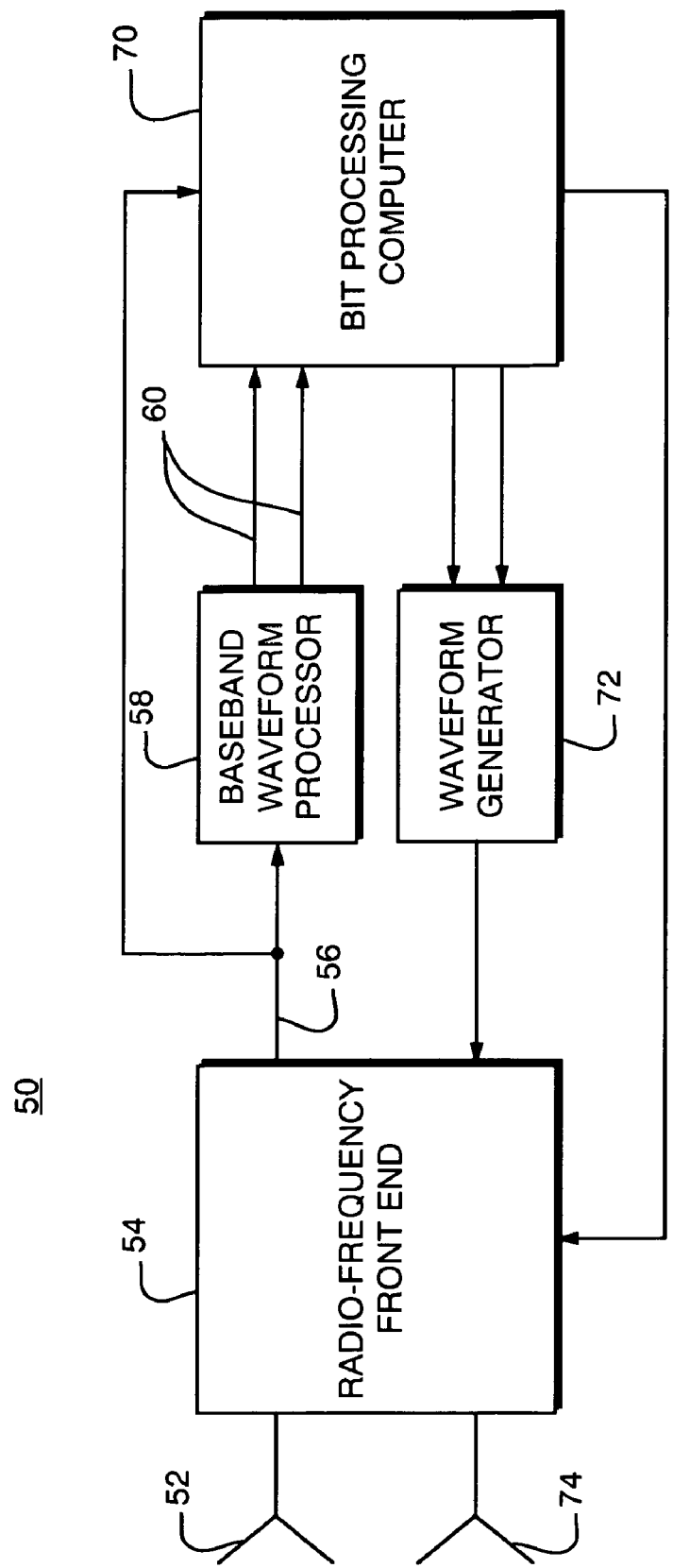
FIG. 2 identifies the principal components of the bandwidth-efficient wireless network modem.

FIG. 2 shows the overall architecture of the bandwidth-efficient modem 50. Signals come in through the receive antenna 52 into a front end 54. The signals arriving at the antennas 52, 74 contain multiple users, multipaths, and other interfering signals. There can be separate reception antennas 52 and transmitting antennas 74, or a single antenna can be used with a diplexer to switch between reception and transmission. In certain applications the antenna(s) 52, 74 are an integral part of the network modem assembly, while other applications can employ external antennas or even no antennas, if the signals are transmitted in a non-wireless application such as a cable modem.

The front end 54 generally performs amplification and downconversion and typically comprises an amplifier, filter and a mixer to downconvert the RF signals to baseband signals, with a digital to analog (D/A) converter to digitize the waveform. The downconversion removes some or all of the carrier component, leaving the baseband signals. Alternatively, with the high computer processing speeds, the received signal could simply be processed through an A/D converter without any RF components. The functionality and design of the front end units are well established to those familiar with the art.

The output of this front end receiver 54 is a baseband waveform 56, which serves as input to the baseband processor 58. It is a bit waveform representation of the RF signal generated by digitized sampling.

Baseband processor 58 employs digital signal processing in a manner described herein to separate the signals transmitted simultaneously by different transmitters over the same communication channel. The baseband processor output 60 produces its data from the intended transmitter on the interfering channel, signaling data from the signaling channel 23 and information about the interfering signals on the respective traffic channel. The message and signaling data are used for operation of the modem in a manner similar to conventional, legacy modems not designed to operate in the presence of interference. The data about the interfering signals is also used to operate in a saturated or overloaded environment where multiple communicators simultaneously transmit on the same channel. There is a large body of work involving signal cancellation methodologies that can be implemented in conjunction with the present invention.

Specifically, the baseband processor 58 calculates the power levels of every interfering signal on the channel, the channel thermal noise level and estimated bit error rates for each signal in the channel. Periodically, this data is transmitted over the signaling channel 23 to the network controller 15 shown in FIG. 1.

The periodic transmissions to the network controller 15 can be based upon request, time, or other signal occurrences. The request, for example, would be from the controller 15 to each of the bandwidth efficient modems or through a broadcast message. The time interval for the periodic transmission of the modem data can be a fixed predetermined time period or a random time period. Finally, the periodic transmission could be based upon certain measurements that trigger the data transmission. The network controller 15 uses this information to make channel assignments in a manner consistent with efficient utilization of allocated bandwidth. The bit processing computer 70 shown in the figure performs error correction, descrambling and packet formatting as is done in conventional modem.

FIG. 2 also shows a data transmission path for the modem to send its data back into the network. This data consists of message information and signaling information wherein the bits are formatted, scrambled and encoded in the bit processor 70 as inputs to the waveform generator 72. The waveform generator 72 creates a baseband modulated digital signal in a manner familiar to those practicing the art. The modulation can be binary phase shift key, quadrature phase shift key, Gaussian minimum shift key, quadrature amplitude modulation or other well-known digital modulations. This baseband waveform is upconverted to the carrier frequency and amplified in front end 54, and transmitted through the transmit antenna 74. It is within the scope of the present invention to use a single antenna for transmission and reception by time multiplexing the transmission and reception of information over the channel.

Figure 3:
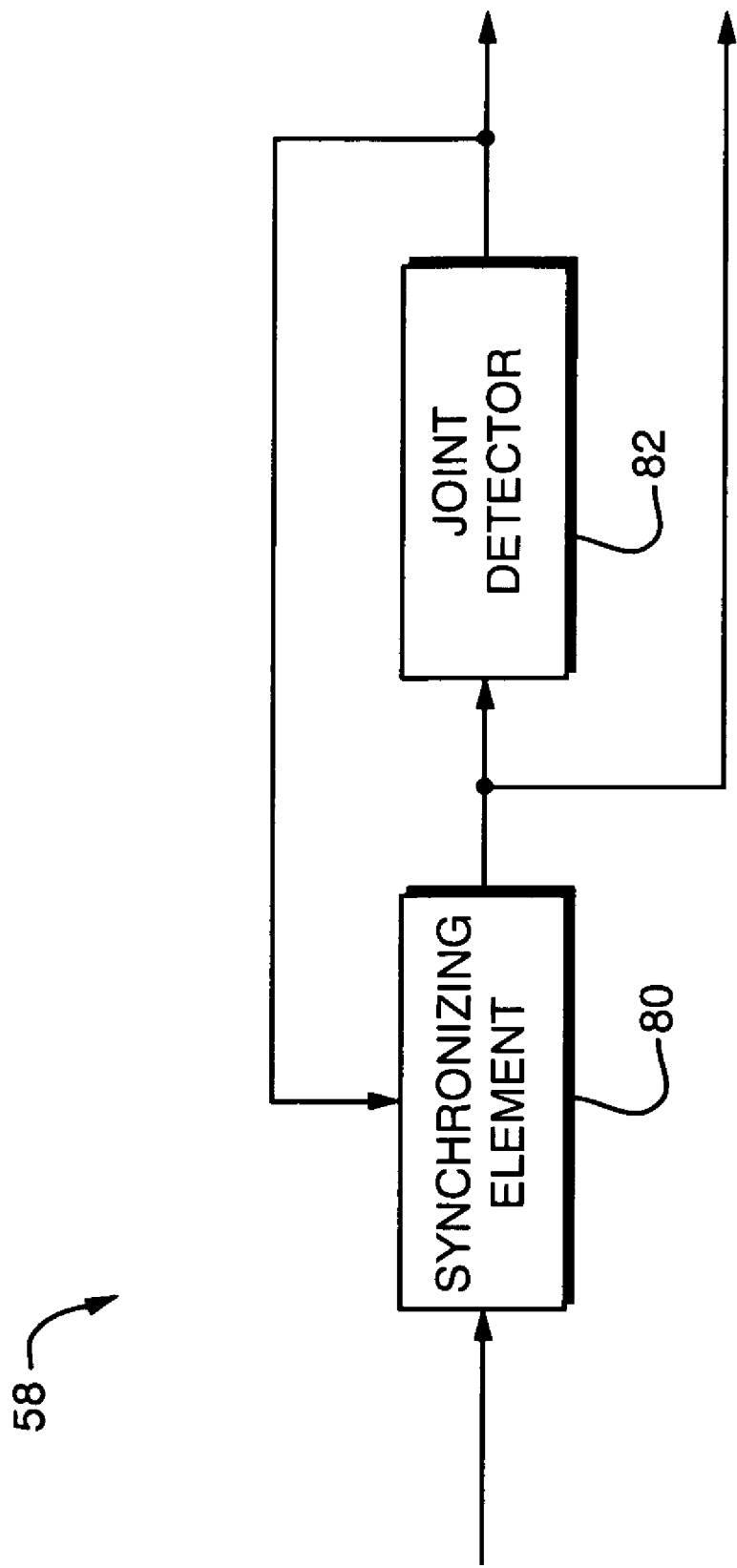
FIG. 3 shows the wireless network modem baseband waveform processor.

FIG. 3 shows the baseband waveform processor 58 in greater detail. This processor 58 performs digital signal processing using ASIC's, FPGA's, programmable digital signal processing chips or microprocessors as the data rates of the channel necessitate, wherein the more general term of digital signal processor will be used to refer to any of the processing types. As inputs, the interfering signals on the channel are fed into the synchronizing element 80. This synchronizing module 80 is sometimes called a parameter estimator and typically estimates the amplitudes, carrier phases, carrier frequencies, symbol rates and symbol phases for each interfering signal in the communication link. It estimates and tracks these parameters continually while the modem is receiving data, and there is a training and acquisition phase similar to a phase lock loop. There are many parameter estimator units, and one embodiment is described in the published U.S. Patent US 2002/0037061 A1 entitled System for Parameter Estimation and Tracking of Interfering Digitally Modulated Signals, which is incorporated by reference for all purposes.

In order to maintain accurate estimates of all interfering signal parameters, the synchronizing element 80 uses the demodulated output from the joint detector 82. The joint detector 82 uses the parameters estimated by the synchronizing element 80 and the input interfering signals to demodulate the interfering signals by estimating the values of the bits transmitted by each interfering signal over the channel. The joint detector 82 tracks the various parameters and creates signal constellations that estimate symbols for each interfering signal.

The joint detector 82 demodulation can utilize multi-user detection (MUD) technology or any other suitable form of demodulation to separate signals. Multi-user detection (MUD) refers to the detection of data in non-orthogonal multiplexes. A MUD receiver jointly demodulates co-channel interfering digital signals, and there are various multiuser detectors in the prior art, including optimal or maximum likelihood MUD, maximum likelihood sequence estimator for multiple interfering users, successive interference cancellation, TurboMUD or iterative MUD, and various linear algebra based multi-user detectors such as all of those detailed in the well-known text "Multiuser Detection" by Sergio Verdu.

These demodulated values are output to the bit processing computer 70 of FIG. 2. In addition to producing estimates of the bit values, the joint detector 82 also produces estimates of the bit error rate for each signal in the channel. The method of determining the bit values and the bit error rate is described in further detail herein. The bit estimates are also fed back to the synchronizing element.

Figure 4:
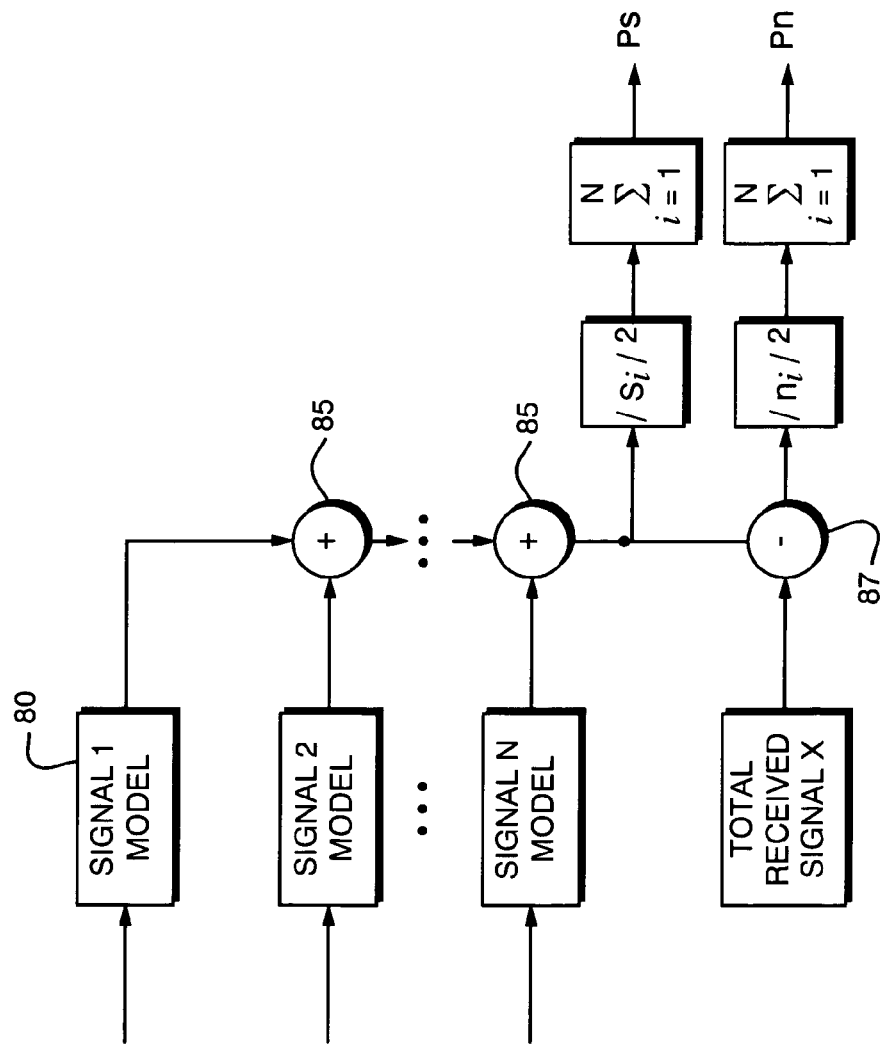
FIG. 4 shows the wireless network modem interference and noise detector processing.

FIG. 4 shows how the bit processing computer 70 estimates the power level of each interfering signal in the channel and the residual random thermal noise power. Using the bit value estimates from the joint detector 80 and parameter estimates from the synchronizing element 82, the bit processing computer 70 reconstructs an estimate of each interfering signal. This processing requires knowing the power of every interfering element in the channel whether signals or noise because the scheduler of the controller terminal, such as in a satellite terminal or wireless LAN terminal, depend on the quality of service of each element experience. The bit processor 70 calculates the signal to noise ration (SNR) and carrier to interference ratio (CIR) for every communicating element in the channel.

The calculation requires adding all the signal models and comparing the total signal power in the channel to the total power in the channel and calculating the signal noise. The noise power is required to determine whether there is sufficient margin in the channel to add signals onto each other.

Signal reconstruction is performed by generating signal models using the amplitudes and phases from the parameter estimation and the bits from the baseband waveform processor. The signal models are generated according to the formula:

$$A_k e^{jphi(t)} m(t, Sphi, b)$$

where

A is the signal amplitude, phi is the carrier phase and frequency offset, b is the estimated bit stream and Sphi is the symbol phase, and m denotes the modulating function such as BPSK, QPSK or other digital modulations.

This function also includes the symbol pulse shape that is known for all modems in the system as part of the system design specification. These model signals are also termed remodulated signals.

Referring to FIG. 4, the linear algebraic processing is accomplished as follows:
X=S+N, wherein
X=received signal;
S=transmitted information signals; and
n=thermal noise
n=X−S $$P_S = \|S\|^2 = \sum_{m=1}^{N} S_m^2$$

wherein Ps represents the norm of the vector S, and N is the number of samples. This is the total received signal power and is the signal component of the total received signal X. The individual signals 80 are summed by the summer 85 for each of the N signal samples, and processed to generate $P_s$.

And, $$P_n = \|n\| = \|X-S\|$$

wherein Pn represents the norm of vector n, and is calculated according to FIG. 4 by subtracting 87 the total received signal X from the summed signal and generating $P_n$. The SNR is the ratio of $P_s/P_n$.

The thermal noise is the random component of noise from the environment and receivers, such as from resistors in the receiver. There are other elements, including some forms of noise that do have some predictable attributes, and any received component that has some structured form can be processed.

Each amplitude estimate from the synchronizing element 80 yields a carrier-to-interference ratio (CIR) estimate according to the formula:

$$CIR_k = |A_k|^2/(|S|^2 - |A_k|^2)$$

where $A_k$ is the estimate of signal k's amplitude and S is the mean amplitude of the total received signal.

The residual noise signal is found by sequentially subtracting each interfering signal model from the baseband waveform. When the model signals are subtracted from the baseband waveform, the channel SNR is found by $$SNR_k = |A_k|^2/(|P_k|^2)$$

where $P_k$ is the mean amplitude of the residual signal. SNR is an important measure for determining the available capacity of the channel for signal k.

While interfering signals can be removed due to their deterministic modulation structure, some elements of residual thermal noise, such as white Guassian noise, are random and unpredictable and cannot be estimated and removed from the channel. However, any noise elements that can be statistically estimated or determined, can be filtered and result in improved performance.

Table A lists the messages and parameters used for operating the control channel signaling interface controller, which exists inside the modem bit processing computer 70. It communicates with the network controller in order to allocate channels among the communicators in an optimal manner. The messages fall into three categories. Channel status parameters are used to estimate the current excess capacity of the channel. These parameters include the carrier-to-interference levels in the channel, the signal-to-thermal noise level and the actual bit error rates. Channel service request messages are used to transact the assignment and to release channels among the user terminals. These messages are initiated by the user terminal and sent to the network controller. Network messages sent to the terminal include status queries, channel reassignments and power changes.

TABLE A showing messages and parameters for the control channel signaling interface controller.

| Function category | Function |
|---|---|
| Channel status parameters | Carrier-to-interference level |
| | Signal-to-noise ratio |
| | Bit error rate |
| Channel service requests | Initiate new channel |
| | Request higher quality channel |
| | Logoff |
| Process received messages | Status query |
| | Channel reassignment |
| | Power change |

Figure 5:
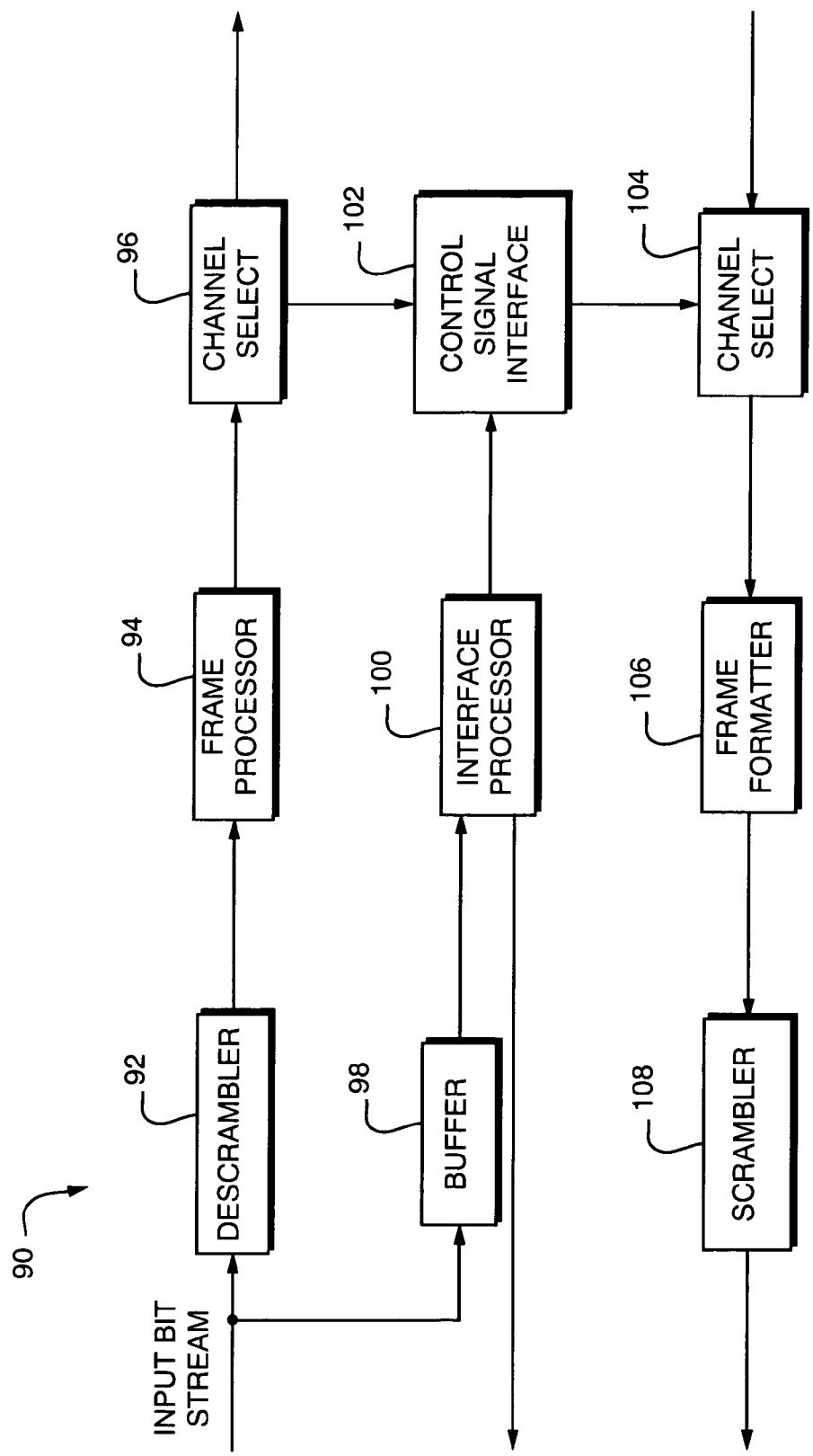
FIG. 5 illustrates the wireless network modem controller and interconnections.

FIG. 5 shows the modem controller 90. Its functions may be implemented as ASIC's, FPGA's, microprocessors, DSP's or software modules in a programmable processor or as some combination of these elements. The preferred embodiment will depend on the channel message rate and the state of the art in the components at the time of implementation. Input bit streams are error-corrected in the joint detector 82 before transmission into the modem controller 90. The error-corrected bit sequence is descrambed in the descrambler 92. The descrambled data is then frame formatted in the frame processor 94 and demultiplexed, producing the message bits from the user terminal.

The interface processor 10 extracts control signals from the input data stream and decodes control messages. The messages are shown in Table A. The interface processor 100 may transmit messages in response to received messages as shown. The control signal interface 102 selects data channels based on interface processor inputs.

The control signal interface processor 102 transmits the interference data to the network control element through the signaling channel. It configures the modem transmit and receive channels The modem controller 90 also contains channel selectors 96, 104 for selecting the correct input channel and for multiplexing the transmit bits onto the correct output channel. The modem controller 90 formats the data into the correct frame or packet structure with appropriate header bits and tail bits. It then optionally error encodes and scrambles the data to be consistent with the communications protocol. The formatted bit sequence is input to the waveform generator described in FIG. 2 for digital modulation.

Table B is a table summarizing the operation of the network control element. The control element assigns channels according to four network modes. 'Applique' radios contain the improved demodulator shown in FIG. 3. 'Legacy' radios are network radios without the improvement. The present invention provides incremental improvement in network performance as improved bandwidth-efficient radios are added to the network. It is not necessary to replace all of the legacy radios in the network to improve bandwidth utilization. As more legacy radios are replaced overall network capacity will continue to increase.

TABLE B showing the network control element

| Mode | Applique radios | | High SNR legacy radios | | Low SNR legacy radios | |
|---|---|---|---|---|---|---|
| | Channel | Code | Channel | Code | Channel | Code |
| Clear | Dedicated | Light | Dedicated | Light | Dedicated | Light |
| Dense | Shared | Light | Dedicated | Light | Dedicated | Light |
| Saturated | Shared | Light | Shared | Light | Dedicated | Light |
| Degraded | Shared | Heavy | Shared | Heavy | Dedicated | Heavy |

The modes are determined by periodically polling the network elements for their calculated interference parameters. The interference parameters give a measure of the Quality of Service provided in the channel. There are four modes addressing different levels of aggregate demand for network service.

1. In clear' mode, each terminal has a dedicated channel, enjoys good propagation and is communicating at full capacity with light encoding. This mode is used by conventional wireless networks.

2. In 'dense' mode, there is more demand than clear channel capacity allows. The network controller allocates additional bandwidth by identifying bandwidth-efficient modems operating in the network and assigning the bandwidth-efficient modems pairwise to the same channel. For example, if A, B, C and D are user terminals employing bandwidth-efficient modems, the communication channels for "A transmitting to B" and "B transmitting to A" are simultaneously assigned as communication channels from "C transmitting to D" and "D transmitting to C" respectively.

3. In 'saturated' mode, all bandwidth-efficient modem have been packed into communication channels with two, three or more modems simultaneously transmitting on the same channel as propagation and SNR conditions will allow. Therefore, the network controller begins assigning bandwidth-efficient modems to channels occupied by legacy modems not capable of demodulating signals in the presence of strong interference. These assignments can be made in cases where legacy radios have sufficient downlink margin due to good siting and propagation to permit operation of bandwidth efficient modems sufficiently high above the noise power to permit signal recovery, yet at sufficiently low power as to not interfere with the legacy demodulators. Example power levels are shown in Table D.

4. In 'degraded' mode, the network controller signals to bandwidth-efficient modems to increase coding redundancy. This mode occurs when too many terminals attempt to communicate for the channel bandwidth and propagation available. Links are maintained on all of the channels at lower throughput using a technique to be described in a future patent.

Table C summarizes the channel assignment algorithm employed by the network controller. This algorithm is executed periodically by the channel scheduler. One implementation would be to run the scan once per superframe, that is, per set of frames such that each terminals has one control slot for communicating status, channel scheduling and control.

TABLE C showing the network control element channel assignment procedure.

| Scan dedicated traffic channels | |
|---|---|
| Check BER: | |
| If BER < B0 | Applique radio available for sharing |
| else | Treat as legacy radio |
| Scan shared traffic channels | |
| Check BER: | |
| If BER > B0 | Find dedicated channel |
| Assign new DAMA traffic | Legacy radios to dedicated channels |
| | Applique radios to dedicated channels - later monitor for shared assignment |

The network scheduler continually scans channels by monitoring quality of service reports on the signaling channel in the form of bit error rates, carrier to interference levels and signal to thermal noise level. Channels with high quality of service margins are available for use by bandwidth-efficient modems. When poor quality of service exists, modems are reassigned to clearer channels. More than likely, legacy modems will use the clearer channels. The bandwidth-efficient modems that have been added to the network can operate on channels where considerable interference exists, particularly from other bandwidth-efficient modems.

Table D is a table showing the channel assignment matrix. The modems are divided into two classes to address the situation where bandwidth-efficient modems have been added to a wireless network where other modems already operate without the ability to demodulate digital signals in the presence of strong interference

TABLE D showing how to add bandwidth-efficient wireless network modems to networks without replacing existing modems.

| Transmitter | Receiver | Min S/N (dB) | Min C/I (dB) |
|---|---|---|---|
| Legacy | Legacy | 9 | 9 |
| Legacy | Applique | 9 | −6 |
| Applique | Legacy | 9 | 9 |
| Applique | Applique | 9 | −6 |

There are four cases corresponding to the two possible transmission and reception modems on the channel. Each modem has a common minimum signal to thermal noise requirement necessary for successful operation of the link. This SNR value is well known from digital communication theory and can be derived using Cramer-Rao bounds from statistical estimation theory. The value shown is representative for a particular modulation and encoding scheme. Actual values will vary accordingly. The minimum carrier-to-interference value is what differs between legacy modems and bandwidth-efficient modems. A legacy modem will treat interference as random thermal noise and be unable to demodulate its intended transmitter in the presence of interference comparable to maximum allowed thermal noise levels.

In contrast, a bandwidth-efficient modem is designed to jointly demodulate its intended transmission and any interfering transmission provided both signal levels are some minimum amount above the thermal noise power level. Therefore, a bandwidth efficient modem can operate in environments where its carrier to interference ratio is much less than one, although the actual value will depend on implementation details.

Figure 6:
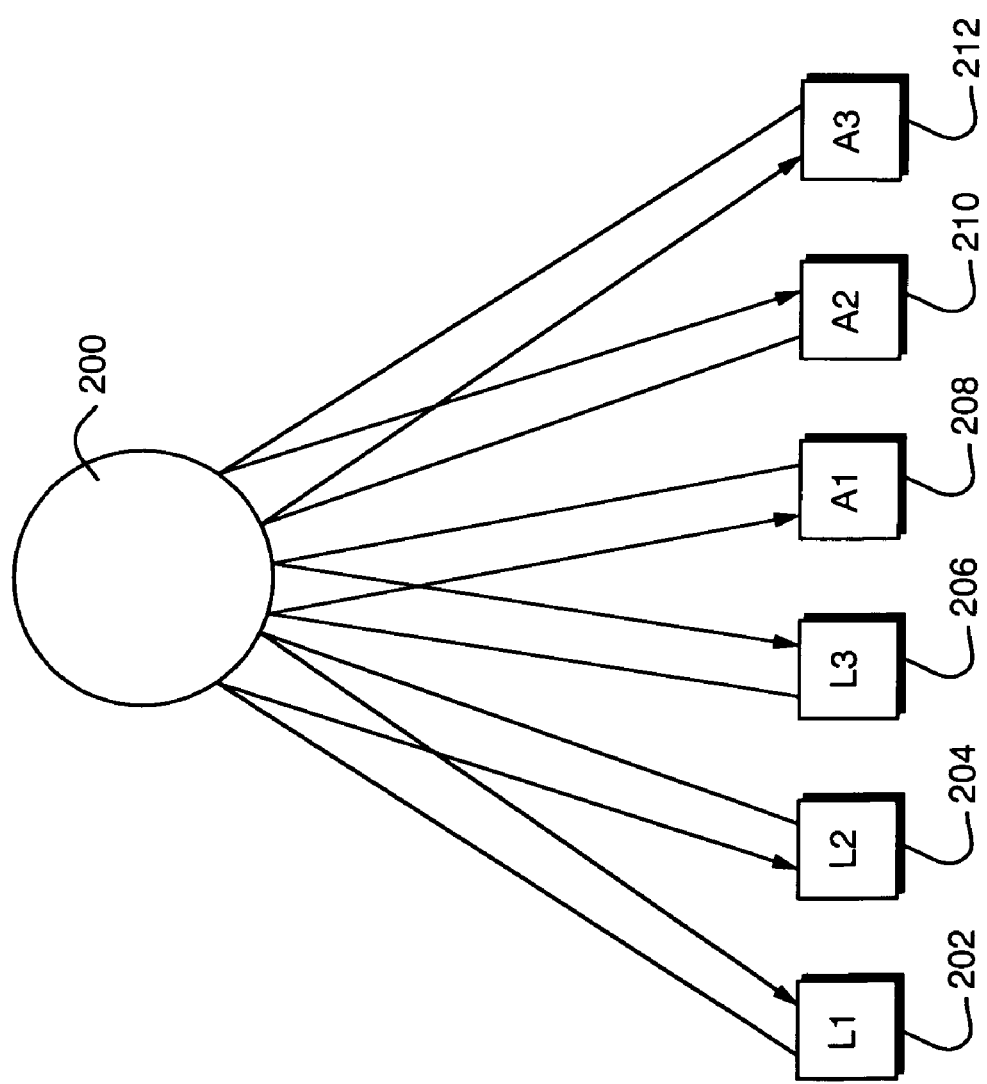
FIG. 6 shows a satellite transponder application with combined legacy terminals and bandwidth efficient terminals

FIG. 6 shows an example where six satellite terminals 202, 204, 206, 208, 210, and 212 share communications through a transponder 200. There are three legacy terminals 202, 204, 206 and three bandwidth-efficient terminals 208, 210, and 212. All communication is full duplex, so each link requires two channel assignments. The channels and terminal assignments are assigned according to the rules given in Table E. As a result, only four physical communication channels are necessary to provide 6 communication links. Also, given sufficient signal margin on channels 1 to 3, additional modems may be added.

TABLE E

Channel Assignments for six satellite terminal

| Channel | Transmitter | Receiver | Assignment | Number |
|---|---|---|---|---|
| 1 | L1 | L2 | Dedicated | 1 |
| 2 | L2 | L1 | Dedicated | 2 |
| 3 | A1 | L3 | Dedicated | 3 |
| 4 | L3 | A1 | Shared | 4 |
| 5 | A2 | A3 | Shared | 4 |
| 6 | A3 | A2 | Shared | 4 |

Each legacy terminal gets a dedicated receiving channel. Due to their abilities to demodulate channels in the presence of interference, each applique modem 208, 210, 212 shares a channel. Given sufficient SNR margin on the legacy receive channels, further channels could be shared by having the applique modem signals buried at low power below the legacy channels. According to Table D, 18 dB SNR margin would be required to ensure that an applique modem at 9 dB SNR meet the 9 dB CIR requirement for the legacy modem and the 9 dB SNR requirement for the applique modem. Other modulation and encoding schemes would have different SNR and CIR threshold parameters.

Figure 7B:
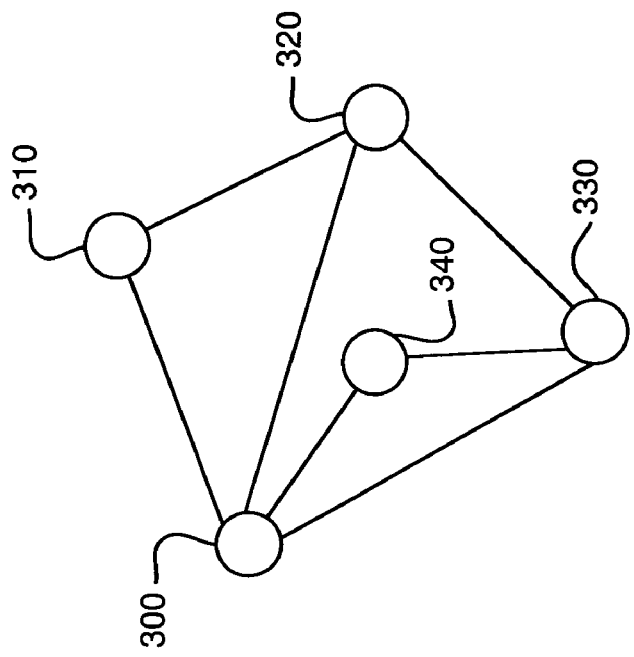
FIG. 7b shows a mesh style network with interconnections between the network controller and bandwidth efficient modems
Figure 7A:
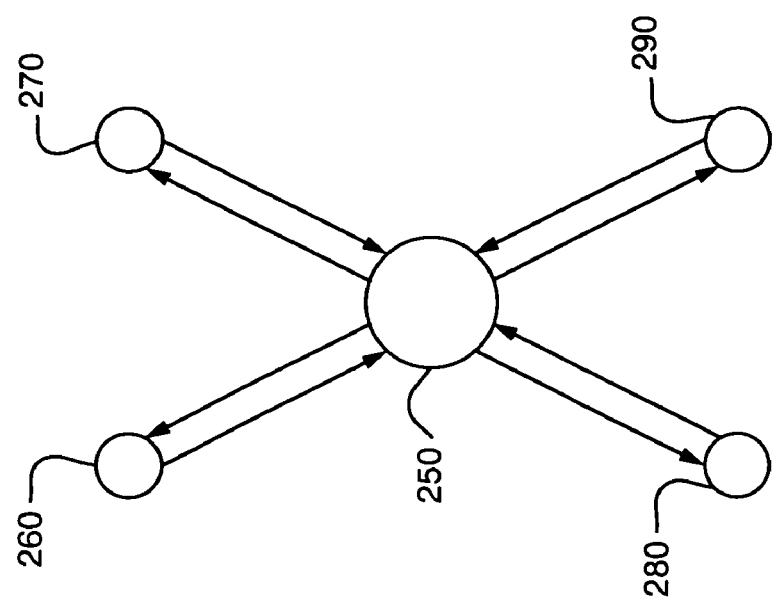
FIG. 7a shows a star network local area network with interconnections between the network controller and bandwidth efficient modems

Referring to FIGS. 7a and 7b, a wireless LAN network is depicted. While the satellite transponder generally transmits balanced power to the receiving terminals, the terminals on a wireless link do not receive equal power. There are essentially two basic types of LAN networks, a star network and mesh network. In the star network of FIG. 7a, all communications go through a central hub 250. A mesh network shown in FIG. 7b, the various terminals 310, 320, 330, 340 are interconnected with the controller 300 assigning the links. In either case, the hub must supervise and manage the communications process. For example, in a TDMA systems, if one terminal takes a time slot for communications, the hub should not otherwise schedule an overlap.

In the mesh network, the control element 300 is selected to avoid the 'hidden terminal' problem, wherein one of the terminals may be obscured from the field of view of one or more of the other terminals. This requirement is satisfied by periodically checking that the controlling element is able to monitor quality of service reports transmitted by all other terminals.

An advantage of the present system is that any bandwidth efficient terminal can function as the control element. If one of the bandwidth efficient terminals malfunctions or no longer has a good field of view, another terminal having better operating characteristics can assume control.

One of the hubs takes the primary role of managing, listening, and scheduling of the channels. For example, in a TDMA system, every frame consists of a control section and a data section. The present invention is primarily intended to improve data transfer, however inefficiency in the control section is tolerated to prevent communications from catastrophic failure. One terminal takes over as the network controller and sends the various sync signals, and processes book-keeping requests from the other terminals. In the mesh network, any terminal can be the network controller. In a hub network, all communication routes through a central network element, so access to all network elements is assured.

In satellite systems, the transponder transmits balanced and regulated power. Every signal looks the same when picked up by the various terminals. This provides a built in redundancy so that if one of the network controllers fails to function, an alternative terminal can take over and cause an automatic bootstrap.

In a wireless system, there is no singular point of balancing and regulating the transmission signals. The system can pick one LAN element as the controller and monitor signal quality. It should be readily apparent that it is difficult to measure the quality of service every terminal experiences. The processing of the present invention may require running the algorithm on every terminal that has multi user capability and have it report back to the controller element, which evaluate the data from every terminal. Otherwise, the ability to schedule terminals on the same channels where excess SNR margin is enjoyed is the same as already described.

An additional application is in the cable modem field, wherein a cable network has excess linear power margin. The cable modems can interconnect to an individual house for example and provide the television and Internet delivery. Cable modems share channels and generally the cable is not saturated and there is sufficient room for adding more signals and still be in a linear state where the receiver unit is not saturated.

In a system wherein all the modems tolerate a level of interference, incorporating a network of modems with joint detection capability allows these modems to extract more signals such as illustrated in FIG. 6. The cable node or head end would be the controller/scheduler for a plurality of cable modem. The available power for additional users is the difference in the power consumed by an existing transmission and the point where the power in the channel goes non-linear, thus defining the linear power limit. Channels can be added to the available bandwidth until the linear power region of the network is consumed. This results in increased channel throughput by adding multiple carriers to the same channel bandwidth. The additional capacity can be gained by using different coding schemes or modulation schemes to place the data on the channel and therefore extract the data from the channel by reversing the process thus increasing the effective throughput of the bandwidth consumed by the initial channel. For example, if the linear power limit was established, and the channel power margin consumed by a single transmission was known, then the available power for additional users is readily available.

The present invention is intended for a multiplicity of protocols involved in frequency reuse technology. The reference to multi user and multi user environments in the present application is not to be limited to referring only to multiple users. The term multi user is applied in the broader context of referring to any type of additional user or signals, whether individual users in a cell phone situation or additional information signals for a given number of users.

Numerous characteristics and advantages have been set forth in the foregoing description, together with details of structures and functions of the present invention, and some of the novel features thereof are pointed out in appended claims. The disclosure, however, is illustrative only, and changes may be made in arrangement and details, within the principle of the invention, to the full extent indicated by the broad general meaning of the terms in which the appended claims are expressed.

The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. A bandwidth efficient modem in a multi-user environment for determining whether additional users can be added to a system, comprising:
    a front end unit for processing input received signals into a baseband waveform;
    a baseband waveform processor performing parameter estimation and demodulation of said baseband waveform, wherein said demodulation uses a processing scheme selected from at least one of the group consisting of: optimal maximum likelihood multi user detection (MUD), maximum likelihood MUD, maximum likelihood sequence estimation, successive interference cancellation, TurboMUD, iterative MUD, and linear algebra based MUD;
    a digital signal processor for reconstructing an estimate of each of one or more interfering signals and calculating a noise power, wherein said noise power is used by a network controller coupled to the bandwidth efficient modem to determine whether there is a sufficient noise margin to add said additional users, said network controller dynamically allocating channel assignments to the bandwidth efficient modem and wherein said reconstructing requires data from said parameter estimation and demodulation; and
    a waveform generator for processing channel communications, wherein said channel communications consist of message and signal information, communicated to said system.

2. The bandwidth efficient modem according to claim 1, further comprising a single antenna with diplexer coupled to said front end unit for transmission and reception.

3. The bandwidth efficient modem according to claim 1, further comprising a reception antenna and a transmitter antenna coupled to said front end.

4. The bandwidth efficient modem according to claim 1, wherein said parameter estimation is performed by a parameter estimator that estimates amplitudes, carrier phases, carrier frequencies, symbol rates and symbol phases for each of said interfering signals.

5. The bandwidth efficient modem according to claim 1, wherein said demodulation is performed by a joint detector in said baseband waveform processor, wherein said joint detector demodulates said interfering signals and produces a set of bit values and bit error rates for each signal.

6. The bandwidth efficient modem according to claim 1, wherein said demodulation processes said baseband waveform in the presence of noise and interference stronger than an information signal.

7. A bandwidth efficient system for a communications network, comprising:
    a plurality of bandwidth efficient modems each interconnected to said network by a traffic channel and a signaling channel, wherein said modems process interference and noise levels in said traffic channel and recover information signals of said traffic channel;
    a central network controller coupled to said bandwidth efficient modems, wherein said controller monitors signal quality of each said traffic channel and dynamically allocates channel assignments to said bandwidth efficient modems according to said interference and noise levels, and wherein each of said bandwidth efficient modems is functional as the network controller; and
    one or more legacy modems coexisting on said network with said bandwidth efficient modems.

8. The bandwidth efficient system according to claim 7, wherein a means for connecting said modem on said network is selected from at least one of the group consisting of: bi-directional channels, indirect through a hub element, and directly via a hardwire connection.

9. The bandwidth efficient system according to claim 7, wherein said signaling channel transfers channel communications based upon conditions selected from at least one of the group consisting of: a request from said network controller, a time interval, and a measured signal level.

10. The bandwidth efficient system according to claim 9, wherein said channel communication comprises channel status parameters, channel service request messages, and network messages.

11. The bandwidth efficient system according to claim 7, wherein said central network controller is coupled to said modems as selected from at least one of the group consisting of: a star network and a mesh network.

12. A method of efficiently allocating channels on a communications network having a network controller coupled to a plurality of bandwidth efficient terminals, comprising the steps of:
    processing a received signal into a baseband waveform in each of said terminals;
    measuring interference and noise levels in a channel of said baseband waveform;
    transmitting said interference and noise levels from said terminals to said network controller;
    processing channel assignments in said network controller based on said interference and noise levels;
    setting a signal level sufficiently low to fall within carrier-to-interference level requirements where the channel is occupied by a legacy terminal;
    setting the signal level sufficiently high where the channel is occupied by one of said bandwidth efficient terminals; and sending transmission and reception channel assignments from said network controller to said terminals.

13. The method of efficiently allocating channels according to claim 12, further comprising the step of assigning bandwidth efficient modems to channels already occupied by other modems when there is sufficient signal-to-noise margin.

14. The method of efficiently allocating channels according to claim 12, wherein said step of measuring comprises the steps of parameter estimation and demodulation.

15. The method of efficiently allocating channels according to claim 12, wherein said network controller is a bandwidth efficient terminal.

* * * * *